Dec. 16, 1969   J. H. VAN DER VELDEN   3,484,123
REUSEABLE FLARELESS TUBE COUPLING

Filed April 18, 1968   2 Sheets-Sheet 1

INVENTOR.
Johannes H. Van der Velden
BY
Bernard A. Donahue
ATTORNEY

INVENTOR.
Johannes H. Van der Velden
BY
Bernard A. Donahue
ATTORNEY

United States Patent Office 3,484,123
Patented Dec. 16, 1969

3,484,123
REUSEABLE FLARELESS TUBE COUPLING
Johannes H. van der Velden, Seattle, Wash., assignor to The Boeing Company, Seattle, Wash., a corporation of Delaware
Filed Apr. 18, 1968, Ser. No. 722,290
Int. Cl. F16l 19/02, 19/08
U.S. Cl. 285—341                                              5 Claims

ABSTRACT OF THE DISCLOSURE

A lightweight reuseable flareless tube coupling assembly comprising a tube, a sleeve member, an externally threaded union member and an internally threaded nut member. The tube end is rigidly affixed to the sleeve by swaging the tube into annular grooves in the inner peripheral wall of the sleeve member. The outer periphery of the sleeve is provided with forwardly and rearwardly facing abutment surfaces. As the nut is tightened on the threads of the union member, the sleeve abutment surfaces interengage with corresponding surfaces on the nut and union to provide gripping and sealing interfaces which rigidly retain the sleeve and effect a seal. With the joint secured in this manner, only minimal and predetermined strains are imposed on the tube, thereby allowing utilization of lightweight, thin-walled tubing materials. Repeated removal and reinstallation for maintenance purposes may be made without deterioration of the coupling assembly.

BACKGROUND OF THE INVENTION

Field of the invention

This invention is classifiable in the art of pipe joints and couplings, and more particularly involves an improved aircraft fluid system flareless tube coupling assembly.

Description of the prior art

Leakage problems in aircraft fluid system coupling assemblies have resulted in considerable effort being expended to improve existing coupling designs and installation procedures.

The tube coupling assembly set forth in U.S. Government specification MIL-F-18280 is typical of many such designs currently in use. These assemblies involve the use of sleeve, or ferrule, which fits over the tube end, a union member and one or more nut members. Testing has shown that leakage in these installations is predominantly due to deficiencies in the sleeve-to-tube joint. In such designs the sleeve is slipped over the tube and the tube end is inserted into the union member. In this position the tube is held against an abutment surface while the nut is torqued onto the union. Torquing of the nut causes the forward inside edge of the sleeve to create a bearing penetration into the tube wall thereby establishing a sleeve-to-tube bite. The bite into the tube wall creates a sealing interface and the tube is rigidly retained between the bite and the abutment on the union member.

In such prior art coupling assemblies, numerous factors can create leakage and retention problems. The tube end and the union surface against which it abuts must be squarely cut to prevent damage to the tube by localized bearing and crippling stresses. Additionally, it is necessary to select tubing thicknesses and material which will tolerate the sleeve-to-tube bite, thereby precluding the use of certain lightweight, thin-walled tubing constructed from high-strength but relatively brittle or notch-sensitive materials. Also, these existing coupling designs require careful control of dimensional tolerances, metallurgical properties and the amount of installation torque applied to the coupling. If these parameters are not closely controlled, such designs will exhibit low reliability against leakage.

SUMMARY

It is the object of this invention to provide an improved aircraft tube coupling assembly which will reduce certain prior art leakage problems, minimize tubing weight penalties imposed by tube coupling techniques, and allow repeated removal and reinstallation without deterioration.

The above objectives are achieved by creating a permanent sleeve-to-tube attachment prior to installation of the union member and the retaining nut, and by configuring abutment surfaces on the outer periphery of the sleeve and on the nut and union members in a manner such that torquing of the nut will result in a rigid gripping of the sleeve member between the union and the nut with only minimal and predetermined strains being imposed on the tube. In this manner a rigid sealed joint may be obtained without the necessity of forcing the tube end into bearing engagement with the union member and without the requirement that the sleeve member physically bite into the tubing material. The interengaging abutment surfaces are configured such that when the nut is torqued onto the union member, the installing mechanic will be able to feel a positive stop at the proper nut location. Additionally, when the nut has been properly installed, elastic forces have been generated within the sleeve and nut which will prevent the nut from backing off.

DESCRIPTION OF THE PREFERRED EMBODIMENTS

Figure 1:
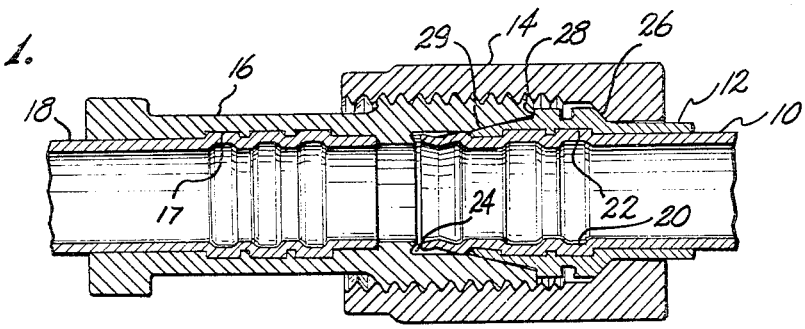
FIGURE 1 is a full section view of a side elevation of a preferred embodiment of a coupling assembly constructed according to the teachings of this disclosure.

FIGURE 1 shows, in full section, a preferred embodiment of the coupling installation wherein the tube 10 has been coupled to the tube 18 by means of the sleeve member 12, an internally threaded nut member 14, and an externally threaded union member 16.

The tube 10 is rigidly affixed to sleeve 12 by a swaging operation which has been performed prior to the joining of the coupling assembly. The tube has been swaged at 20 into annular grooves 22 in the inner periphery of sleeve 12. In this embodiment the tube 18 has been affixed to union 16 by swaging at 17. Note that in the final installation depicted here that the end of tube 10 does not contact the union member and a clearance is maintained at 24.

The nut 14 is interfaced with the sleeve 12 at 26. Upon torquing the nut onto the union 16, a compression force is generated within the sleeve by pressure applied through nut interface 26 and reacted by the union positive stop interface 28.

Figure 2:
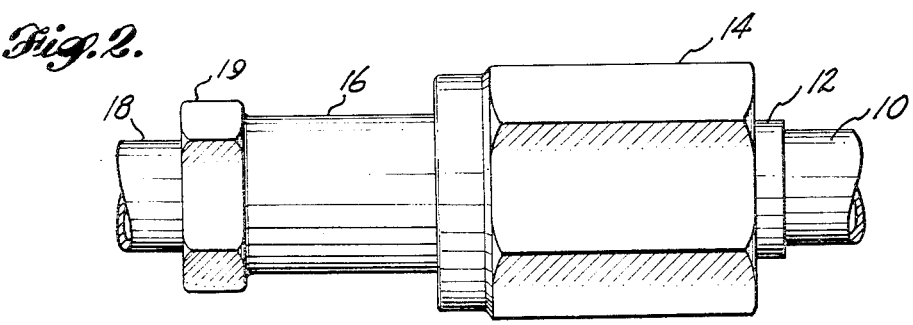
FIGURE 2 is a side elevation view of the embodiment of FIGURE 1.

FIGURE 2 is a conventional side elevation view of the installation of FIGURE 1 which displays the exterior appearance of the coupling assembly and the location of the hexagonal wrenching surfaces, at 14 and at 19, which are used for applying and reacting the installation torque.

Figure 3:
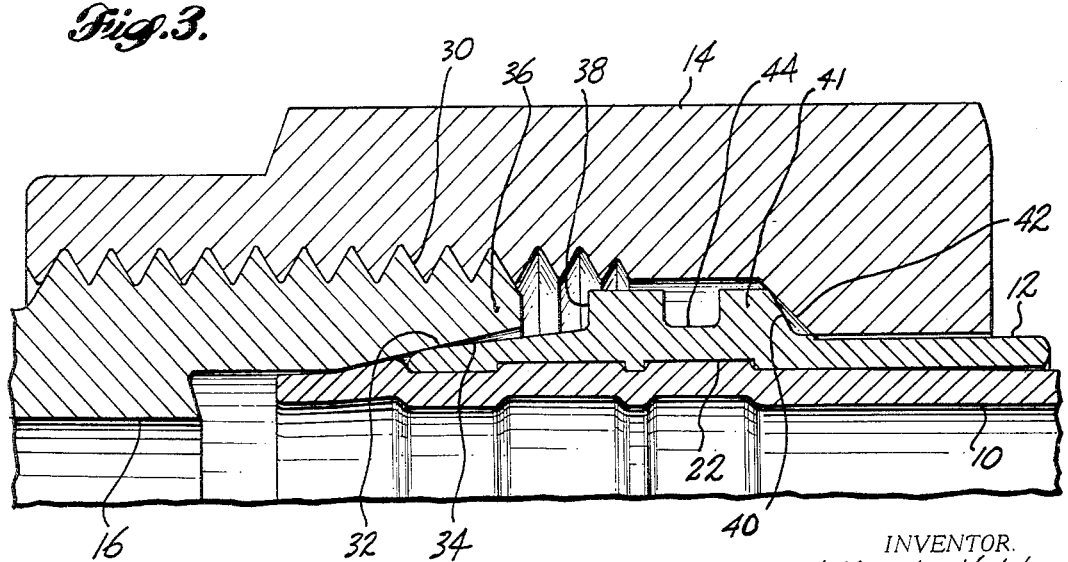
FIGURE 3 is a fragmentary section view showing the position of the parts of the coupling assembly prior to the torquing of the nut onto the union member.

The FIGURE 3 fragmentary section shows the position of the coupling assembly members just prior to the application of installation torque. Tube 10 has been rigidly affixed to sleeve 12 by a swaging operation at 22. The nut 14 is threadedly engaged with union member 16, and the nut has been turned on the threads 30 until the nut surface 42 has come in contact with sleeve surface 40. The sloping sleeve surface 34 has been brought into initial contact with sloping union surface 32.

In this embodiment the nut shoulder surface 42 is inclined at about 45° while the corresponding sleeve shoulder surface 40 is preferably inclined at approximately 55° so that the sleeve shoulder 41 will be forced to elastically deflect as the coupling is tightened. Similarly, the union sloped surface 32 is inclined at approximately 12° while the corresponding sleeve sloped surface 34 is arranged and shaped such that a gripping and sealing interface is created by wedge-action as the coupling is tightened.

Figure 4:
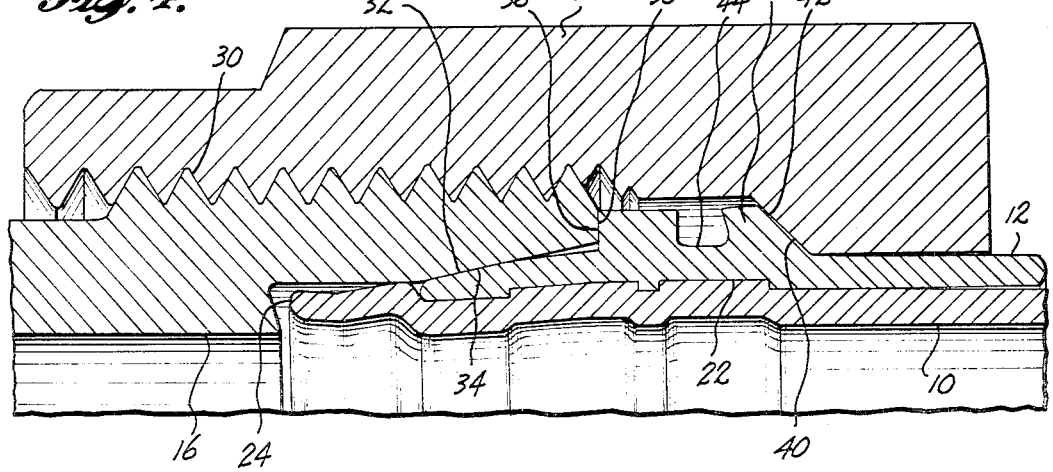
FIGURE 4 is a fragmentary section view of the preferred embodiment showing the installed coupling assembly after the nut has ben torqued to its positive stop position.

The FIGURE 4 fragmentary section view shows the final position of the coupling assembly members after the nut has been torqued to its positive stop position. Note that the tube end at 24 does not contact the union member 16. The sleeve shoulder 41 has been elastically deflected until the sleeve surface 40 is in bearing contact with the nut surface 42. The sleeve stop surface 38 is in bearing contact with the union stop surface 36. In this position, it can be seen that the sleeve member is tightly gripped between union stop surface 36 and nut surface 42 and that further movement of the nut is not possible with normal torquing forces.

The elastic deflection of shoulder 41 achieves a resiliency in the joint which will prevent the nut from backing off under vibration. It should be noted that the depth and shape of recess 44 is tailored to obtain a desired elastic force-deflection characteristic for the shoulder 41 and surface 40. The recess 44 may be reduced in size, or eliminated altogether, in some cases.

In the FIGURE 4 assembly, the sleeve and its surface 34 have been elastically deflected by wedge-action such that it is now in nearly full bearing contact with union surface 32. Radial gripping forces have been imparted to the sleeve and tube through the sloping surfaces 34 and 40. These forces together with the longitudinal gripping action imparted to the sleeve at 38 and 40 cause the coupling assembly to rigidly retain and seal the tube without the necessity of either a sleeve-to-tube bite or a tube-to-union bearing engagement. The sleeve shape and the interengaging surfaces on the sleeve, nut, and union members which have been disclosed here can be experimentally rearranged and modified to give any desired amount of gripping action and/or elastic strain in the tubing. However, to minimize leakage problems, the strain in the tubing should be held to a predetermined value which is preferably below the elastic limit for the tubing material.

Figure 5:
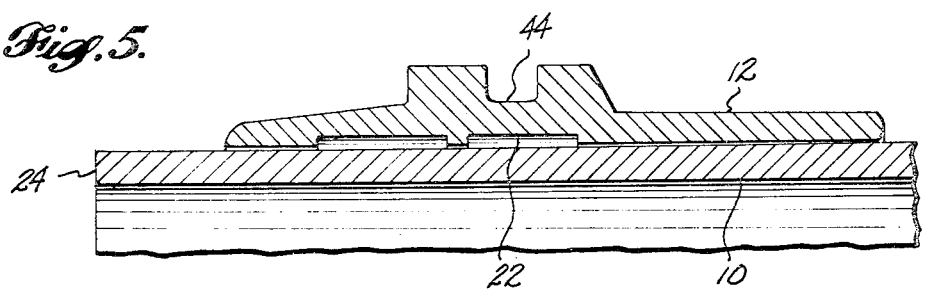
FIGURE 5 is a fragmentary section view of the sleeve in place over the tube prior to the swaging operation.

FIGURE 5 illustrates the sleeve in position over the tube prior to swaging. Conventional swaging or shock forming techniques may be used. Also, experimental work has shown that in many installations explosive swaging may be performed satisfactorily. While the sleeve 12 has been shown with two annular swaging grooves 22, it should be understood that the number and shape of such swaging grooves may be tailored to suit the materials and gages involved.

Figure 6:
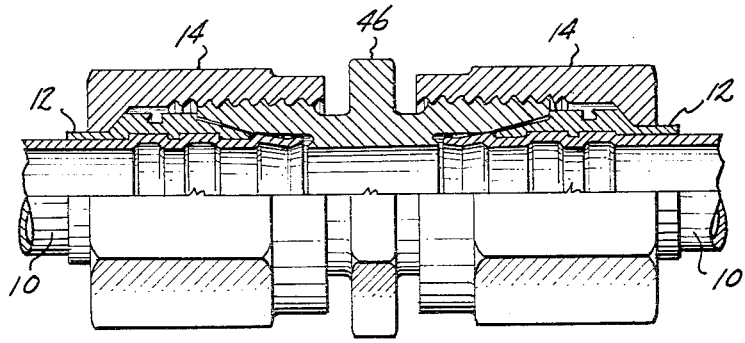
FIGURE 6 is a side elevation view of an optional coupling embodiment, shown half in section.

FIGURE 6 shows an optional two-nut coupling configuration wherein both of the tubes to be joined are held by a sleeve in the manner of the tube 10 in the FIGURE 1 embodiment. This optional configuration is somewhat heavier than the FIGURE 1 embodiment but it has the advantage that it is interchangeable with coupling assemblies currently in service. Replacement installation of these couplings during rework and repair of existing aircraft systems will result in improved reliability while allowing the use of lighter weight tubing.

While the invention has been described and illustrated herein with reference to preferred embodiments thereof, it will be understood by those skilled in the art that various changes in form and detail may be made therein without departing from the spirit and scope of the invention.

What is claimed is:

1. A lightweight reuseable tube coupling assembly comprising:
    a tube member,
    a sleeve member which encircles said tube member and is rigidly affixed thereto, said sleeve member including a forward portion, a rear portion, and an intermediate portion extending radially outwardly beyond said forward and rear portions, said sleeve being positioned on said tube member such that said rear portion is closest to the end of said tube member which is to be coupled by said coupling assembly,
    an externally threaded union member,
    an internally threaded nut member encircling said sleeve member and applying a force thereto, said nut member being threadedly engaged with said union member,
    said tube member and said sleeve member constituting a rigid integral unit irrespective of the extent of threaded engagement of said nut member on said union member, said sleeve member having been rigidly affixed to said tube member prior to the installation of said nut member on said union member whereby said sleeve member is prevented from relative axial and rotary movement with respect to said tube member.
    said sleeve, union and nut members including interengaging surface means for controlling the relative displacement of said members during installation of said nut member,
    said interengaging surface means comprising radial gripping means for generating a controlled radially directed gripping force on said sleeve and said tube whereby said tube is rigidly retained by said coupling assembly and said interengaging surface means establish a sealing interface, said radial gripping means comprising a sloped surface on said rear portion of said sleeve member, said sloped surface decreasing in diameter in a rearwardly direction and being in cooperative relationship with an inwardly facing surface on said union member, and
    said interengaging surface means further comprising positive stop means for restraining relative movement of said sleeve, union and nut members after said tube member has been strained by said radially directed gripping force only a predetermined amount, and for preventing a bearing penetration of the wall of said tube by said sleeve during installation of said nut member, said positive stop means including a surface on said union member which is aligned generally perpendicular to the longitudinal centerline of said tube coupling assembly and which is arranged for interengagement with another surface of said interengaging surface means to prevent bearing penetration by any portion of said sleeve member into said tube member, and to prevent the end face of said tubing member from coming into contact with said union member.

2. The tube coupling assembly of claim 1 wherein said sleeve and said nut members are configured such that the interengaging surface means further cooperate to generate an elastic force which acts on said nut member to prevent loosening of the assembly during vibration.

3. A tube coupling assembly, comprising:
  a generally cylindrically-shaped, axially-extending sleeve member including inner and outer peripheral walls, the inner peripheral wall defining an annular groove positioned intermediate the ends of said sleeve, said sleeve member further including forward and rear end portions and an intermediate portion extending radially outwardly beyond the outer peripheral walls of said forward and rear end portions; said intermediate sleeve portion including forwardly and rearwardly facing abutment surfaces; the outer peripheral wall of said rear end portion including a sloping abutment surface,
  a tube end swaged outwardly into the annular groove in the inner peripheral wall of said sleeve member to rigidly affix said tube end to said sleeve member prior to the installation of said nut member on said union member,
  a generally axially-extending, cylindrically-shaped, externally-threaded union member having a forward end portion encircling the rear end portion of said sleeve member; said union member including a forwardly facing end surface substantially normal to the longitudinal axis of the tube in abutting relationship with the rearwardly facing end surface of the intermediate portion of said sleeve member said abutting surfaces comprising means for preventing bearing penetration of said tube end by said sleeve member; said union member further including an inwardly facing surface in abutting relationship with the sloping abutment surface of the rear end portion of said sleeve member, and
  a generally axially-extending, cylindrically-shaped internally-threaded nut member in threaded engagement with said union member; said nut member encircling the intermediate portion of said sleeve member; said nut member further including a radially inwardly extending shoulder spaced from said forwardly facing end surface of said union member and encircling a portion of said forward portion of said sleeve member; said shoulder of said nut member including a rearwardly facing surface in abutting relationship with said forwardly facing surface of the intermediate portion of said sleeve member.

4. A lightweight reuseable tube coupling assembly comprising:
  a tube member,
  a sleeve member which encircles said tube member and is rigidly affixed thereto, said member comprising inner and outer peripheral walls, the inner wall defining an annular groove of generally rectangular cross section, said sleeve member including a forward portion, a rear portion and an intermediate portion extending radially outwardly beyond said forward and rear portions, said sleeve being positioned on said tube member such that said rear portion is closest to the end of said tube member which is to be coupled by said coupling assembly,
  said tube member being swaged outwardly from its nominal diameter into said annular groove in said sleeve member,
  an externally threaded union member,
  an internally threaded nut member encircling said sleeve member and applying a force thereto, said nut member being threadedly engaged with said union member,
  said tube member and said sleeve membr constituting a rigid integral unit irrespective of the extent of threaded engagement of said nut member on said union member, said sleeve member having been rigidly affixed to said tube member prior to the installation of said nut member on said union member,
  said sleeve, union and nut members including interengaging surface means for controlling the relative displacement of said members during installation of said nut member,
  said interengaging surface means comprising radial gripping means for generating a controlled radially directed gripping force on said sleeve and said tube whereby said tube is rigidly retained by said coupling assembly and said interengaging surface means establish a sealing interface, and
  said interengaging surface means further comprising positive stop means for restraining relative movement of said sleeve, union and nut members after said tube member has been strained by said radially directed gripping force only a predetermined amount, and for preventing a bearing penetration of the wall of said tube by said sleeve during installation of said nut member, said positive stop means comprising an abutment surface on said union member which interengages with an abutment surface on said sleeve member, each of said abutment surfaces being aligned essentially perpendicular to the centerline of said tube member, said radial gripping means comprising a sloped surface on said rear portion of said sleeve member, said sloped surface decreasing in diameter in a rearwardly direction and being in cooperative relationship with an inwardly facing surface on said union member.

5. The coupling assembly of claim 4 wherein said interengaging surface means includes means for generating a longitudinal gripping force and a second radial gripping force on said sleeve and for preventing said nut from backing off under vibration comprising a surface on said nut which is inclined at approximately 45° acting against a corresponding deformable surface on said sleeve which is initially inclined at approximately 55°, and wherein said radial gripping means comprises a surface on said union which is inclined at approximately 12° and a corresponding sleeve sloped surface arranged and shaped such that a gripping and sealing interface is created by wedge action as the coupling is tightened to the limit established by said positive stop means.

References Cited

UNITED STATES PATENTS

| 786,551 | 4/1905 | Doolittle | 285—382.5 X |
| 2,754,577 | 7/1956 | Maxwell | 285—382.4 X |
| 3,055,684 | 9/1962 | Currie | 285—382.7 X |
| 3,112,940 | 12/1963 | Crawford | 285—382.7 X |
| 3,186,739 | 6/1965 | Mahoff et al. | 285—382.4 X |
| 3,325,192 | 6/1967 | Sullivan | 285—382.7 X |
| 3,326,582 | 6/1967 | Currie | 285—382.7 X |

FOREIGN PATENTS

| 569,135 | 5/1945 | Great Britain. |
| 841,869 | 7/1960 | Great Britain. |

THOMAS F. CALLAGHAN, Primary Examiner

U.S. Cl. X.R.

285—369, 382.5, 382.7